Patented Oct. 24, 1950

2,527,240

UNITED STATES PATENT OFFICE 2,527,240

MANUFACTURE OF ORGANIC POLYCARBAMATES FROM CHLOROFORMIC ESTERS

William Baird, Peter Gaubert, and Arthur Lowe, Blackley, Manchester, England, assignors to Imperial Chemical Industries Limited, a corporation of Great Britain No Drawing. Application July 1, 1947, Serial No. 758,464. In Great Britain July 12, 1946

9 Claims. (Cl. 260—404.5)

This invention relates to a new process for the manufacture of organic polycarbamates, including organic bis-carbamates.

It is already known to manufacture organic polycarbamates by the interaction of polyhydric alcohols or phenols with carbamyl chloride. The present invention avoids the use of this objectionable compound.

According to the invention we provide a process for the manufacture of organic polycarbamates of the formula $R(OCONR'R'')_n$ wherein R stands for an aliphatic radical, substituted or not, R' and R'' stand for hydrogen or for an organic residue or residues, the same or different, and $n$ stands for a whole number greater than 1 which comprises causing ammonia or a primary or secondary amine to interact with the chloroformic esters obtained by the interaction of one or more compounds of the formula $R(OH)_n$, wherein R and $n$ have the significance stated above, with phosgene.

Suitable compounds of the formula $R(OH)_n$ which may be used in the process of this invention include ethylene glycol, trimethylene glycol, hexamethylene glycol, octadecane-1:12-diol, castor oil, hydrogenated castor oil, glycerol, dibenzoylmannitol, N:N'-ethylene-bis-ricinoleamide and 11-hydroxystearic-$\beta$:$\beta$-dihydroxyethylamide.

Primary and secondary amines which may be used include diethylamine, piperidine, methylamine and aniline.

The interaction of the compounds of the formula $R(OH)_n$ with phosgene is brought about by mixing the reagents, preferably at a temperature of from about 30 to about 35° C., conveniently in solution in an inert organic liquid for example benzene, toluene or ethylene dichloride, or by mixing the compound of formula $R(OH)_n$ with liquid phosgene. If the compound of the formula $R(OH)_n$ contains two —OH groups attached to the adjacent carbon atoms or to carbon atoms separated by less than four other atoms, the mixing of the reagents is so performed as to avoid a high concentration of the compound of the formula $R(OH)_n$ relative to the concentration of the phosgene, thereby avoiding the formation of a ring compound. The chloroformic ester so obtained may, if desired, be isolated by evaporating the organic liquid. Ammonia or the primary or secondary amine may conveniently be added to the solution of the chloroformic ester, preferably at a temperature of from about 50 to about 60° C. without prior isolation thereof and the polycarbamate so formed may be isolated by filtration or by evaporation.

The polycarbamates made by the process of this invention are useful as intermediates for the manufacture of compounds which are useful for the treatment of textile materials.

The invention is illustrated but not limited by the following examples in which parts are by weight.

Example 1

125 parts of phosgene are dissolved in 870 parts of dry toluene and the solution is cooled in ice. 31 parts of ethylene glycol are added with stirring during 30 minutes. The solution is allowed to warm to room temperature and after standing overnight is heated to 50° C. and air-blown to remove phosgene and hydrogen chloride. The chloroformic ester may be isolated by evaporating the solution.

The solution of the chloroformic ester obtained as described above is cooled in ice and ammonia is passed into the solution until evolution of heat ceases. The mixture is filtered and the precipitate is extracted with 800 parts of boiling absolute alcohol. The ethanol solution so obtained is screened and allowed to crystallise. The crude ethylene glycol biscarbamate so obtained may be purified by recrystallisation from 90% ethanol. The pure ethylene glycol biscarbamate so obtained has M. P. 166–168° C.

The biscarbamates from trimethylene glycol, M. P. 168–170° C. and 1:4-butane diol, M. P. 197–9° C. are obtained in a similar manner.

Example 2

75 parts of phosgene are dissolved in 520 parts of dry toluene and the solution is cooled in ice. 29.5 parts of hexamethylene glycol are added and the mixture is allowed to warm to room temperature and after standing overnight is air-blown at 50° C. to remove phosgene and hydrogen chloride. The chloroformic ester may be isolated by evaporating the solution.

The solution of the chloroformic ester obtained as described above is cooled in ice and ammonia is passed into the solution until evolution of heat ceases. The mixture is filtered and the residue is dried at 60° C. 500 parts of boiling water are added and the mixture is filtered. The residue is crude hexamethylene glycol biscarbamate and may be purified by crystallisation from 1200 parts of absolute ethanol. The product so obtained has M. P. 187–189° C.

In a similar manner is prepared the biscarbamate from decamethylene glycol which when pure has M. P. 172° C.

Example 3

38 parts of trimethylene glycol are added to a solution of phosgene in 870 parts of dry toluene. The temperature of the mixture rises from 20° C. to 28° C. The mixture is stirred overnight and then heated to 60° C. and air-blown to remove phosgene and hydrogen chloride. The chloroformic ester may be isolated by evaporating the solution.

To the solution of the chloroformic ester obtained as described above are added with stirring 20 parts of diethylamine, the temperature being maintained below 20° C. by external cooling. The mixture is filtered and from the filtrate toluene is removed by evaporation. The residue is distilled under 7 mm. of mercury pressure when pure trimethylene glycol bis-diethyl carbamate is collected at 174–176° C.

Example 4

90 parts of octadecane-1:12-diol are dissolved at 60° C. in 300 parts of benzene and the mixture is cooled to 27° C. when crystallisation occurs. A steady stream of phosgene is then passed into the suspension with vigorous stirring and cooling, the temperature being maintained at 25–30° C. throughout. The mixture gradually forms a clear solution and when 70 parts of phosgene have been absorbed the passage of phosgene is discontinued. The temperature is then raised to 80° C. during 1 hour and there maintained for a further hour, a current of air being passed through the mixture to remove excess phosgene and hydrogen chloride. The chloroformic ester may be isolated by evaporating the solution.

The clear solution of the chloroformic ester obtained as described above is cooled to 20° C. and a steady stream of ammonia is passed through the solution with cooling until the temperature no longer shows any tendency to rise, the maximum temperature being 50° C. The warm solution is then filtered to remove ammonium chloride and the filtrate is allowed to cool, when octadecane-1:12-diol-bis-carbamate crystallises in white needles, M. P. 94–95° C. which are readily isolated by filtration.

Example 5

98 parts of hydrogenated castor oil are dissolved in 200 parts of benzene at 75° C. and the solution is cooled to 40° C. when crystallisation occurs. A steady stream of phosgene is then passed into the suspension with vigorous stirring and cooling, the temperature being maintained at 40–45° C. throughout. A clear solution gradually forms and when 35 parts of phosgene have been absorbed the passage of phosgene is discontinued. The temperature is then raised during 1 hour to 80° C. and there maintained for a further hour whilst a stream of air is passed through the solution to remove excess phosgene and hydrogen chloride. The chloroformic ester may be isolated by evaporating the solution.

The clear solution of the chloroformic ester obtained as described above is cooled to 30° C. and a stream of ammonia is passed through the solution until the temperature no longer tends to rise, the maximum temperature being 60° C. The benzene is then evaporated and the residue is boiled with 400 parts of water. On cooling, the mixture of poly-carbamates consisting essentially of tristearin-11:11′:11″-triol-tris-carbamate separates as a hard waxy solid on the surface of the mixture and is easily removed. If desired it may be purified by crystallisation from organic solvents from which it separates in white plates M. P. 79°.

Example 6

184 parts of castor oil are dissolved in 400 parts of benzene and a steady stream of phosgene is passed through the solution with stirring and cooling, the temperature being kept at 20–30° C. When 65 parts of phosgene have been absorbed the passage of phosgene is discontinued and the temperature is raised slowly under reflux to 80° C., a steady stream of air being passed through the solution till excess phosgene and hydrogen chloride have been removed. The chloroformic ester may be isolated by evaporating the solution.

The solution of the chloroformic ester obtained as described above is cooled to 30° C. and a stream of ammonia is passed through the solution until the temperature no longer shows a tendency to rise, maximum temperature being 45° C. The mixture is then filtered and the solvent is removed from the filtrate by evaporation under reduced pressure. The mixture of polycarbamates consisting essentially of triolein-11:11′:11″-triol-tris-carbamate, is isolated in this way as a pale yellow viscous liquid.

Example 7

194 parts of 11-hydroxystearic-$\beta$:$\beta'$-dihydroxyethylamide—prepared by reacting methyl 11-hydroxy stearate with diethanolamine—are dissolved in 200 parts of benzene at 20° C. A steady stream of phosgene is then passed into the solution with vigorous stirring, the temperature being allowed to rise to 35° C. The passage of phosgene is discontinued when 145 parts of phosgene have been absorbed and a stream of air is passed through the solution to remove excess phosgene and hydrogen chloride. The chloroformic ester may be isolated by evaporating the solution.

The clear solution of the chloroformic ester so obtained is cooled to 20° C. and a stream of ammonia is passed through with cooling until the temperature no longer tends to rise, the maximum temperature being 50° C. 600 parts of water are then added, the mixture is stirred to dissolve ammonium chloride and allowed to stand until it separates into two layers. The upper layer is separated and the wet benzene is evaporated. The carbamate is isolated in this way as a pale brownish oil.

Example 8

A solution of the chloroformic ester prepared as described in Example 5 from 75 parts of hydrogenated castor oil and 300 parts of benzene is added with stirring to a solution of 55 parts of aniline in 55 parts of benzene at 20° C. Heat is evolved with separation of aniline hydrochloride and the temperature is allowed to rise to 50° C. and held there for 1 hour. The reaction mixture is filtered and the filtrate is washed with dilute hydrochloric acid and then with water and the solvent is removed by vacuum distillation. The mixture of polycarbamates consisting essentially of tristearin-11:11′:11″-triol-tris-carbamate is isolated in this way as a pale yellow viscous liquid.

Example 9

A solution of the chloroformic ester prepared as described in Example 5 from 75 parts of hydrogenated castor oil and 300 parts of benzene is evaporated under reduced pressure and the residual oil is added to 740 parts of a 20% aqueous solution of methylamine during ½ hour with stirring and cooling. The mixture is stirred at 20° C. for 2 hours and the solid product is then washed with dilute hydrochloric acid. The sticky product is boiled with 200 parts of water and on cooling the mixture of polycarbamates consisting essentially of tristearin-11:11':11''-triol-tris-methylcarbamate separates as a hard waxy solid on the surface of the mixture and is easily removed.

We claim:
1. Tristearin-11:11':11''-triol-tris-carbamate.
2. Triolein-11:11':11''-triol-tris-carbamate.
3. Organic triscarbamates having the general formula $R(OCONH_2)_3$ wherein R is the aliphatic radical of a glyceryl compound selected from the group consisting of castor oil and hydrogenated castor oil.
4. A process for the manufacture of organic triscarbamates from chloroformic esters which comprises reacting ammonia with the chloroformic ester obtained by interaction of phosgene with a glyceryl compound selected from the group consisting of castor oil and hydrogenated castor oil.
5. A process for the manufacture of organic triscarbamates from chloroformic esters which comprises reacting ammonia with a chloroformic ester of the formula $R(OCOCl)_3$ wherein R is the aliphatic radical of a glyceryl compound selected from the group consisting of castor oil and hydrogenated castor oil.
6. A process as claimed in claim 4 wherein ammonia is reacted with the chloroformic ester made by reaction of castor oil with phosgene.
7. A process as claimed in claim 4 wherein ammonia is reacted with the chloroformic ester made by reaction of hydrogenated castor oil with phosgene.
8. A process as claimed in claim 4 wherein the reaction of the chloroformic ester and the ammonia is performed at a temperature between 50° C. and 60° C.
9. A process as claimed in claim 4 wherein the reaction of the chloroformic ester and the ammonia is performed at a temperature of between 50° C. and 60° C. in the presence of an inert organic liquid.

WILLIAM BAIRD.
PETER GAUBERT.
ARTHUR LOWE.

REFERENCES CITED

The following references are of record in the file of this patent:

UNITED STATES PATENTS

| Number | Name | Date |
|---|---|---|
| 1,817,992 | Leopold et al. | Aug. 11, 1931 |
| 1,927,858 | Ulrich et al. | Sept. 26, 1933 |
| 2,394,592 | Chenicek | Feb. 12, 1946 |
| 2,395,750 | Muskat | Feb. 26, 1946 |

FOREIGN PATENTS

| Number | Country | Date |
|---|---|---|
| 874,876 | France | Aug. 28, 1942 |